No. 824,847. PATENTED JULY 3, 1906.
R. CONRAD.
BALL BEARING.
APPLICATION FILED MAY 10, 1904.
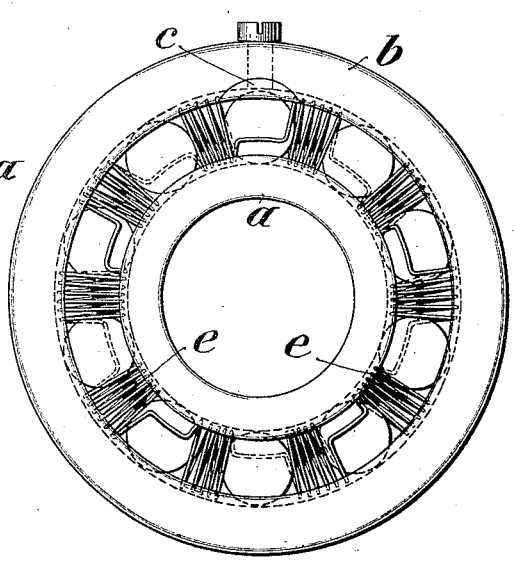
WITNESSES: INVENTOR
Robert Conrad
By his Attorneys

UNITED STATES PATENT OFFICE.

ROBERT CONRAD, OF BERLIN, GERMANY.

BALL-BEARING.

No. 824,847.   Specification of Letters Patent.   Patented July 3, 1906.

Application filed May 10, 1904. Serial No. 207,217.

*To all whom it may concern:*

Be it known that I, ROBERT CONRAD, engineer, a subject of the German Emperor, residing at 248 Kurfürstendam, Berlin, in the Empire of Germany, have invented certain new and useful Improvements in Ball-Bearings, of which the following is a specification, reference being had to the drawings hereunto annexed and to the letters marked thereon.

The invention relates to improvements in ball-bearings of that class in which spiral or helical springs are placed between the balls. These springs are attended with great advantages, inasmuch as they permit silent working and the ball-bearings are rendered capable of resisting heavy shocks, variations of pressure, and the like, and in case of faulty mounting they work far better than bearings in which the balls run one alongside the other and in direct contact with one another.

The invention is capable of adaptation to a great variety of types of ball-bearing.

Now the present invention has for its object the construction of a ball-bearing in which the advantage of inserting a greater number of balls is combined with that offered by bearings having ball-separating devices, and, moreover, to obtain an advantage not hitherto attained, but nevertheless of great importance—that is to say, to secure the ball-bearing against tilting.

In the accompanying drawings a ball-bearing constructed according to the present invention is illustrated as an example.

Figure 1 represents a front elevation of a particular construction of ball-bearing according to this principle, and Fig. 2 is a cross-section thereof.

This ball-bearing consists of two rings $a$ and $b$ concentrically arranged with relation to one another, each having a running surface, path, or race. The outer ring $b$ has a filling-aperture $c$, which may, for instance, consist, as shown in the drawings, of a space closed by a sliding plate kept in its closing position by means of a screw. This sliding plate when in its closing position completes the path of the outer ring, so as to fill up the aperture. Through this aperture a great number of balls and in some cases also the ball-separating devices may be better introduced than would be possible if no such filling-aperture were employed; but, on the other hand, the disadvantage of an aperture must be taken into consideration. By means of these ball-separating devices the ball-bearings will be protected, as many experiments have proved, notwithstanding the filling-aperture they possess, against the injurious effects of vibrations, variations of pressure, and shocks of all kinds, and also, as the case may be, against the effects of careless mounting and the injurious effects of tilting, which effects are, as is well-known, very detrimental to ball-bearings. The bearing according to this invention therefore possesses all the advantages afforded by the filling-aperture in combination with that of safety against tilting, which is very important, and against all the strains resulting from tilting.

In order to render the introduction of the ball-separating devices between the rings feasible, it is necessary that said device be either capable of being deformed or of being divided. The deformation may be obtained by making the device of an elastic kind, or the device may not be of such kind. In the latter case the alteration of shape may be obtained by bending the device or by any other suitable method. In the example given the ball-separating devices are of an elastic character. They are formed by a continuous spring $e$ of wire, wound like helices or screws in the parts placed between the balls. Also intermediate ball-separating devices of another shape or kind may of course be used.

Various modifications may be made without departing from the invention, the scope of which is defined in the following claims.

Having now particularly described and ascertained the nature of the said invention and in what manner the same is to be performed, I declare that what I claim is—

1. In ball-bearings in combination, two parts having running-surfaces, one of said parts having a filling-aperture serving for the introduction of balls, and ball-separating devices connected serially to each other and adapted to be introduced through said aperture.

2. In ball-bearings in combination, two parts having running-surfaces, one of said parts having a filling-aperture serving for the introduction of balls, and ball-separating devices comprising spiral springs connected to but spaced apart from each other and adapted to be introduced through said aperture.

ROBERT CONRAD

Witnesses:
HENRY HASPER,
WOLDEMAR HAUPT